Jan. 31, 1956 C. E. LANSIL 2,733,414

FREQUENCY SUPPRESSION FILTER

Filed Nov. 14, 1951 5 Sheets-Sheet 1

INVENTOR.
CLIFFORD E. LANSIL
BY Kenway, Jenney, Witter & Hildreth
ATTORNEYS

Jan. 31, 1956 C. E. LANSIL 2,733,414

FREQUENCY SUPPRESSION FILTER

Filed Nov. 14, 1951 5 Sheets-Sheet 2

INVENTOR.
CLIFFORD E. LANSIL
BY Kenway, Jenney, Witter & Hildreth,
ATTORNEYS

Jan. 31, 1956 C. E. LANSIL 2,733,414

FREQUENCY SUPPRESSION FILTER

Filed Nov. 14, 1951 5 Sheets-Sheet 3

INVENTOR.
CLIFFORD E. LANSIL
BY Kenway, Jenney, Witter & Hildreth,
ATTORNEYS

Jan. 31, 1956 C. E. LANSIL 2,733,414

FREQUENCY SUPPRESSION FILTER

Filed Nov. 14, 1951 5 Sheets-Sheet 4

INVENTOR.
CLIFFORD E. LANSIL
BY Kenway, Jenney, Witter & Hildreth,
ATTORNEYS

INVENTOR.
CLIFFORD E. LANSIL
BY Kenway, Jenney, Witter & Hildreth
ATTORNEYS 2,733,414

FREQUENCY SUPPRESSION FILTER

Clifford E. Lansil, Arlington, Mass., assignor to The Gamewell Company, Newton Upper Falls, Mass., a corporation of Massachusetts Application November 14, 1951, Serial No. 256,266

5 Claims. (Cl. 333—77)

The present invention relates to frequency-selective networks and more particularly to a filter network suitable for use in the receiver of a facsimile transmission system. A description of a complete system incorporating the invention is given in the copending application of Weld, Serial No. 235,793, filed July 9, 1951.

As indicated in the above application, the synchronizing and framing of the receiver and transmitter require the use of three basic carrier frequencies. One frequency, called the "marking carrier frequency," is modulated by the impulses from the photoelectric scanning device in the transmitter. A second, called the "synchronizing carrier frequency," is modulated by a synchronizing signal equal in frequency to that of the voltage driving the transmitter drum. A third, called the "framing carrier frequency," functions in conjunction with the framing operation.

A principal object of the present invention is to provide a frequency discriminating network in the receiver having the property of discriminating against the synchronizing carrier frequency, with relatively little reduction of the other two carrier frequencies.

A second object is to provide a sharply discriminating network adapted to provide a wide range of frequency adjustment using a single variable parameter, including the property that the more expensive parts of the network may be constructed with low tolerances.

A third object is to provide a filter network of the type described above adaptable to include additional means for suppression of several different frequencies with little cost over that of the basic filter network.

A fourth object is to provide a filter network that is grounded and conductive to ground on the output side because of the effect upon the stability of the following stage, as will hereinafter be shown in more detail.

A feature of the present invention is the provision of a network incorporating a mutual inductance, the mutual inductance having a primary winding in the input circuit in series with a capacitance, and a secondary winding in the output circuit in series with an adjustable portion of a potentiometer connected in parallel with the capacitance.

With the above objects in view, other features of the invention include certain additional features and circuits, the purposes and advantages of which are explained in the following description and more particularly defined by the claims.

Figure 2:
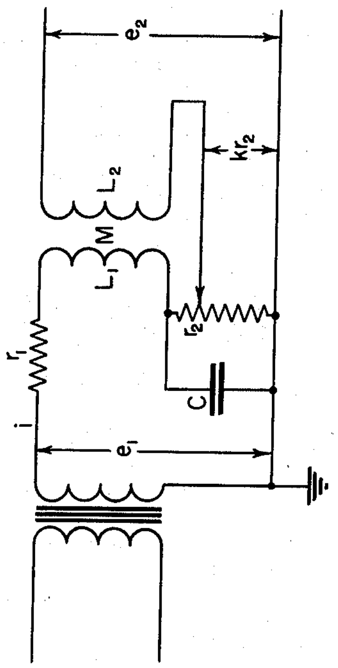
Figure 1:
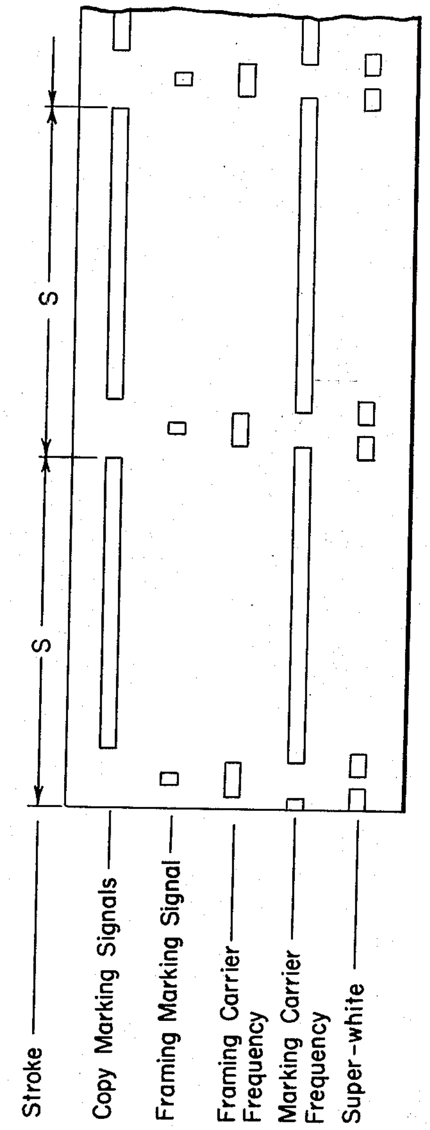
Figure 3:
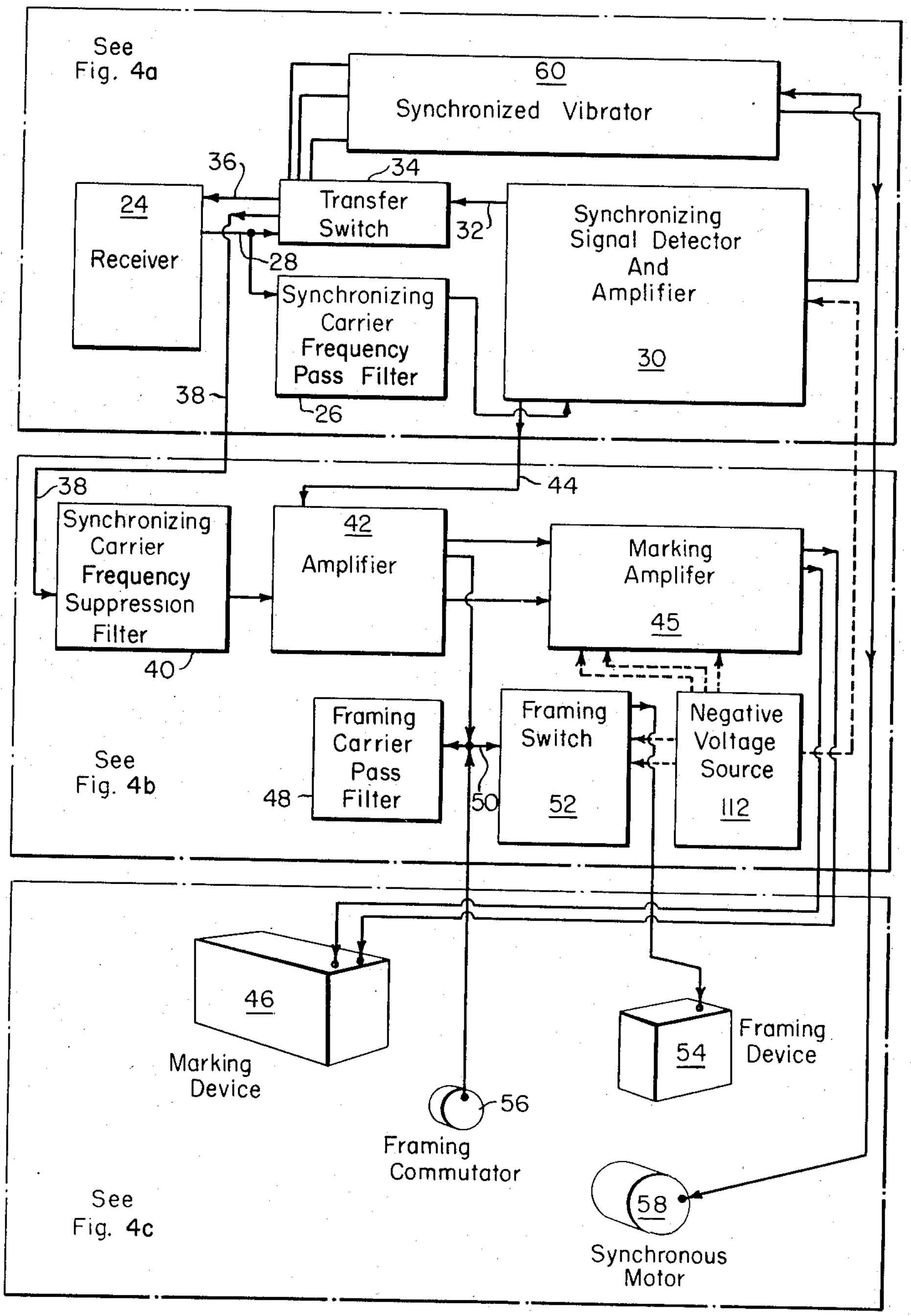

In the drawings, Fig. 1 is a signal timing diagram; Fig. 2 is a schematic circuit diagram of the suppression filter; Fig. 3 is a block diagram of the facsimile receiver; and Figs. 4*a*, 4*b* and 4*c* (adapted for use together as one drawing) show the schematic circuit diagram of the facsimile receiver.

*Signal timing diagram*

Referring first to Fig. 1, the signals emanating from the facsimile transmitter are represented as bars on a horizontal time axis. They are periodic with a period, or stroke, S. Two complete strokes are shown.

Fig. 1 applies regardless of whether transmission is by a metallic circuit or by radio waves. In either case there are three basic carrier frequencies as indicated above, which are mixed together and which may or may not be used to modulate a carrier of higher frequency for purposes of transmission.

Fig. 1 is conveniently explained in terms of its relation to the movements of the drum at the transmitter upon which the copy is mounted. This drum rotates continuously. A photoelectric device is mounted to move continuously in a line parallel to the axis of the drum as it rotates. The basic arrangement is well known in the communications art, and has been described in many patents, including, for example, the patent to Artzt, No. 2,326,740.

The original matter to be transmitted, for example a picture, is wrapped upon the drum with either the horizontal or vertical dimension parallel to the axis of the drum. One margin of the matter parallel to the axis is located in a definite relation to the scanning device at each moment during the stroke S. Referring to the copy marking signals (Fig. 1), from the end of one such signal to the beginning of the next the scanning device scans a margin of the original matter parallel to the drum axis.

The marking carrier frequency, which may be, say, 3000 cycles per second, is on from a moment during the scanning of the margin until a moment during the succeeding scanning of the margin. The copy marking signals, which are the photoelectric signals from the scanning device, are modulated upon this frequency.

During the brief period that the marking carrier frequency is off the framing carrier frequency of, say, 2000 cycles per second is on. Special commutators on the transmitter drum cause this frequency to be modulated for a brief period with a framing marking signal corresponding to that of the scanning device reading a very black or "super-black," region. At all other times while the copy marking signals are off these commutators cause both the marking and framing carriers to be modulated with a signal corresponding to that of the scanning device reading a very white, or "super-white," region.

Throughout each stroke the synchronizing carrier frequency, which may be 4000 cycles per second, for example, is on. This frequency is continuously modulated by a synchronizing signal of, say, 60 cycles per second. The latter frequency is that of the motor driving the transmitter drum.

A description of a transmitter designed to produce facsimile signals like those heretofore described may be found in the above-mentioned application of Weld.

*Block diagram-receiver*

Fig. 3 is a block diagram of the facsimile receiver, assuming that the transmitted signal emanates from a radio transmitter. Accordingly, a radio receiver 24 receives the signal and demodulates it to the form in which it entered the radio transmitter. For purposes of illustration, it may further be assumed that the entire facsimile receiver is located in an automotive vehicle and specifically that the receiver 24 is a conventional voice radio receiver.

Assuming first that no waves emanate from the facsimile transmitter, the facsimile receiver will be in an initial condition referred to herein as the stand-by condition. In this condition the receiver 24 operates for normal voice reception. This condition is produced by a relay connection in the following manner. A synchronizing carrier frequency pass filter 26 which is connected to the receiver 24 over a lead 28 is connected with a synchronizing signal detector and amplifier 30. If there is present in the lead 28 a modulated synchronizing carrier frequency, the modulating frequency is demodulated, amplified, and connected over a lead 32 to energize a transfer switch 34. This switch, when not energized by this signal, connects the lead 28 to a lead 36 connected with the receiver 24, and thus completes a circuit to the speaker of the receiver.

Assuming next that a signal is received from the facsimile transmitter, the facsimile receiver is brought into a condition, referred to herein as the operating condition, by the transfer switch 34, which becomes energized and continues in the energized condition as long as the modulated synchronizing carrier frequency appears in the lead 28. When the switch is in the energized condition the lead 28 is switched from the lead 36 to a lead 38 connected with a synchronizing carrier frequency suppression filter 40. The filter 40 forms the subject of the present invention, and its function is to eliminate the synchronizing carrier frequency while passing a substantial amount of each of the other carrier frequencies, namely the framing and marking carrier signals, one or the other of which will also be present in the lead 38. For example, assuming as above that the synchronizing carrier is at 4000 cycles per second, and the framing and marking carriers are at 2000 and 3000 cycles per second, respectively, the filter 40 is substantially a low-pass filter tuned to suppress frequencies of 4000 cycles per second and above.

The output of the filter 40 is connected with an amplifier 42. This amplifier is provided with automatic volume control by a lead 44 from the detecting element in the synchronizing signal detector and amplifier 30. Thus, the automatic volume control level is determined by the level of the detected synchronizing signal.

The output of the amplifier 42 is two-fold. One connection is with a marking amplifier 45 which is in turn connected with a marking device 46. This device produces the facsimile copy. A second connection is through a framing carrier pass filter 48 and a lead 50 to a framing switch 52. The switch 52 is normally in the unenergized condition. It becomes energized upon the appearance of a framing carrier signal in the lead 50, thus operating a framing device 54. This device operates in a manner hereinafter more fully described to frame the copy, that is, to produce the required correspondence between the instantaneous displacements of the drums at the transmitter and receiver. The operation of the framing device may be, and normally is, suppressed by a connection between a framing commutator 56, mounted coaxially with the drum at the receiver, and the filter 48. It is only when the copy is out of frame that the framing relay 52 is brought into operation.

The drum at the receiver is driven by a synchronous motor 58 having as a source of energy a synchronized vibrator 60. For example, this may be a reed vibrator similar to that which is used in conventional automobile receivers. The natural frequency of the vibrator is in the neighborhood of the synchronizing signal frequency. However, through a connection from the synchronizing signal detector and amplifier 30 the vibrator is caused to operate in exact synchronism with the transmitted synchronizing signal. Thus, once the framing device has operated after the facsimile receiver has been brought into the operating condition, in the absence of aberrations in the received signal, the synchronous motor 58 could keep the drums in synchronism and properly framed without further operation of the framing device.

*Circuit diagram—receiver*

Figure 4A:
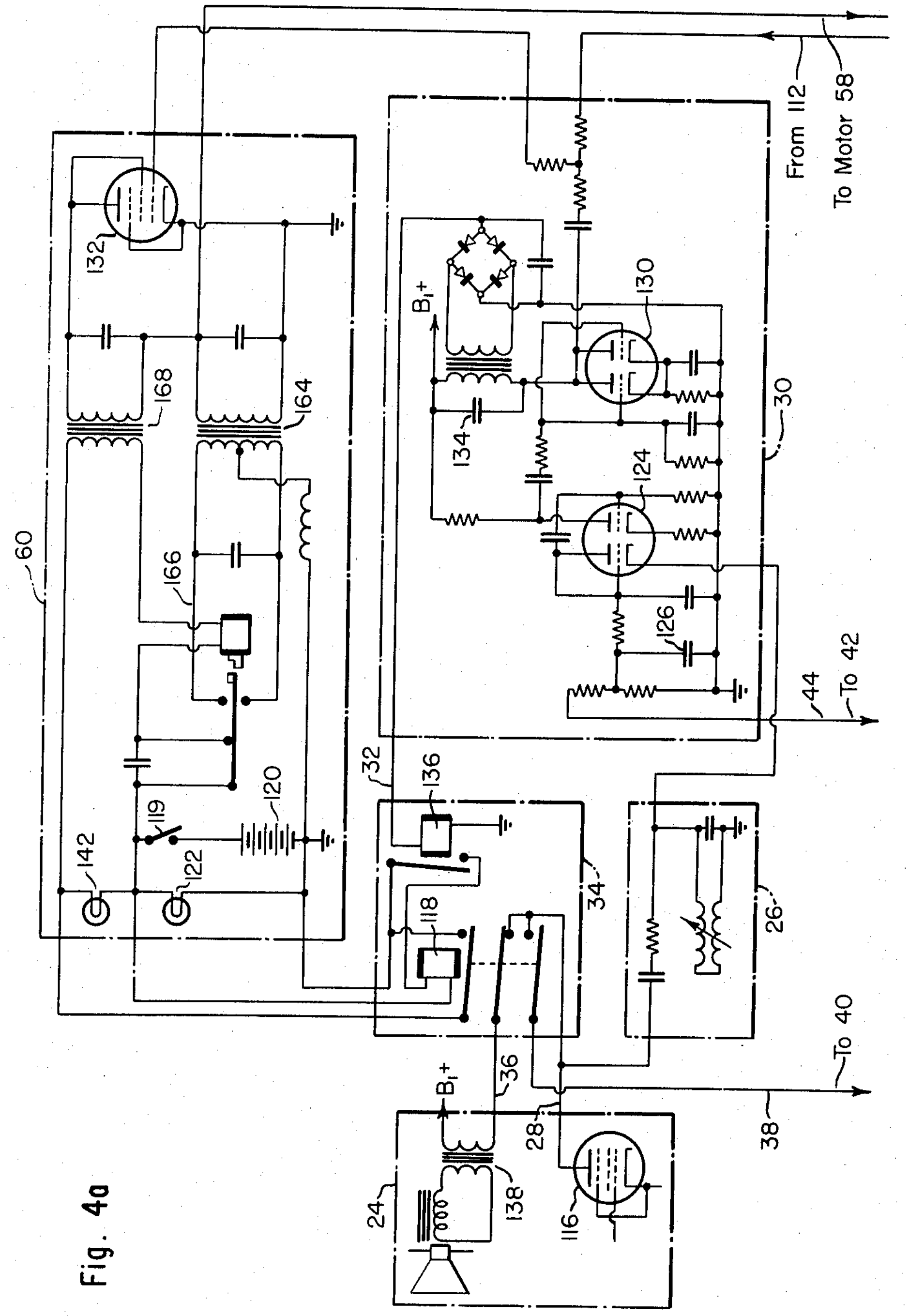
Figure 4B:
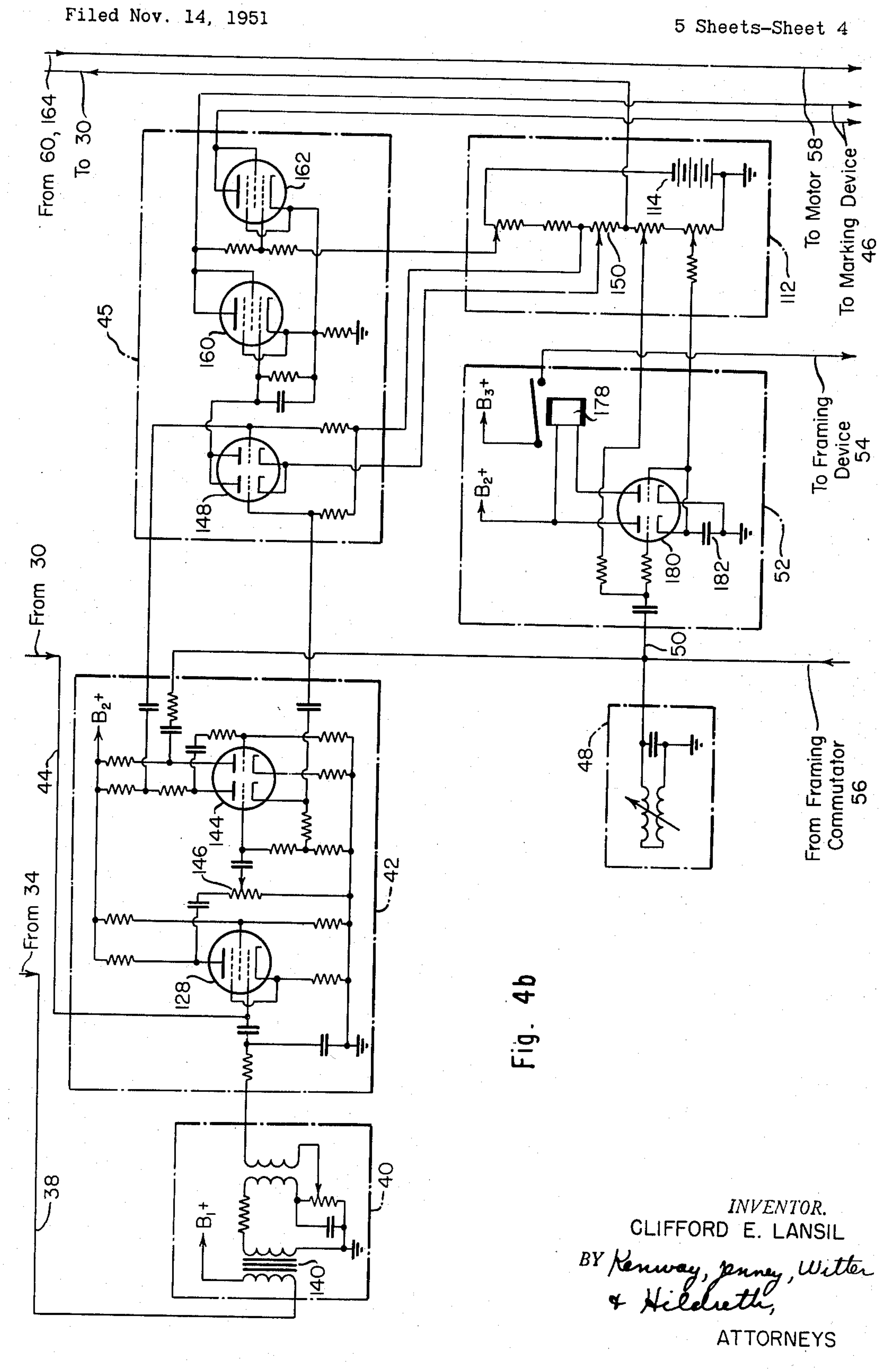
Figure 4C:
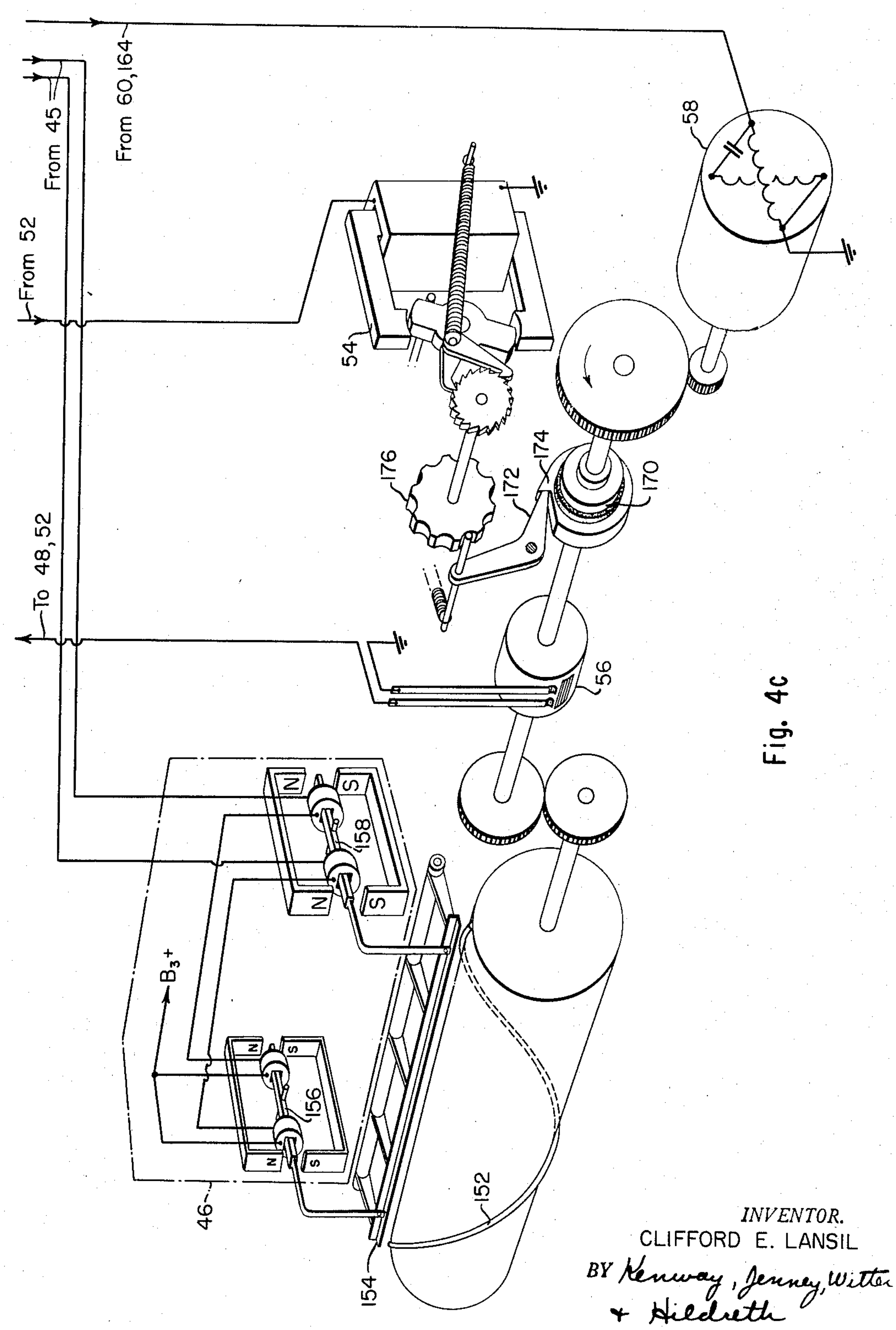

Figs. 4*a*, 4*b* and 4*c*, which are adapted to form a single sheet of drawing when arranged alphabetically from top to bottom, show a circuit diagram of the facsimile receiver. It is assumed in this diagram that the filaments of all tubes are supplied by an appropriate source. In the case of a mobile receiver installation this is preferably a direct current source. There are three B+ voltage sources, designated as $B_1+$, $B_2+$ and $B_3+$, respectively. There is also a source of negative voltage 112 shown schematically as supplied by a battery 114. The dash-dot lines correspond to the outlines of the various blocks in Fig. 3.

As indicated above, the facsimile receiver is coupled to the output stage of the conventional voice radio receiver 24 (Fig. 4*a*). This connection is such that the plate supply to the output tube, which may be a pentode 116, is connected through normally closed contacts of a transfer relay 118. The plate supply $B_1+$ is the power supply for the output stage of the voice receiver.

Assuming that the facsimile receiver is to be put into operation, a switch 119 is closed. This connects a direct current power source 120 across a "standby" lamp 122. This lamp remains lighted at all times while the receiver is in condition for receiving facsimile signals.

All signals present at the plate of the radio receiver output tube 116 are also present at the inputs to the transfer switch 34 and the synchronizing carrier frequency pass filter 26 through the lead 28. The filter 26 is antiresonant and responds to a narrow band of frequencies centering around the synchronizing carrier frequency. The filter output is applied to one-half of a tube 124, connected as a diode and operating as a demodulator or detector.

The detected signal has a direct-current component and an alternating component having the synchronizing signal frequency. The direct-current component is sufficiently filtered by a capacitor 126 to be used for automatic volume control of an amplifier tube 128 (Fig. 4*b*). The alternating component is applied to the grid of the amplifier half of the tube 124 (Fig. 4*a*). This amplified output is then coupled through a low pass filter to a second amplifier tube 130, which is a double triode with its elements connected in parallel. A portion of the output voltage of this tube is applied to the grid of a synchronizing tube 132, hereinafter more fully described. The tube 130 has a transformer coupled output, the secondary voltage being bridge-rectified. The transformer is partially resonated at the synchronizing frequency by a capacitor 134 in parallel with its primary. If there is a synchronizing signal frequency present at the grids of the tube 130 there is a resultant rectified voltage on the lead 32 and a signal relay 136 is energized. This in turn energizes the transfer relay 118.

It will be noted that the plate supply for both of the tubes 124 and 130 is indicated as identical with that of the radio receiver output tube 116. However, this does not represent a serious drain upon the supply, since the current can be kept below 4 milliamperes by proper designing.

When the transfer relay 118 becomes energized, its contacts operate first to parallel the primary of the radio receiver output transformer 138 with the primary of the facsimile receiver input transformer 140. The plate connection of the radio receiver output transformer is then disconnected. This substitutes the transformer 140 for the transformer 138, silencing the radio loudspeaker. A third pair of contacts on the relay 118 connect the battery 120 across an "operating" lamp 142. This lamp remains lighted at all times while the receiver is actually receiving a facsimile transmission.

The output of the transformer 140 passes through the synchronizing carrier frequency suppression filter 40, which may also be termed a point suppression filter (Fig. 4*b*). As already indicated, this filter removes the synchronizing carrier frequency and greatly reduces all higher frequencies. It is assumed that the marking and framing carrier frequencies are below the synchronizing carrier frequency. These are only slightly suppressed by the filter 40.

The filtered signal is then coupled to the pentode amplifier tube 128, which also operates as an automatic volume control, receiving its control bias from the rectified output of the tube 124, mentioned above. The output of the tube 128 is coupled to the grid of one half of a tube 144 through a framing and marking amplitude control 146. This half of the tube 144 acts as an impedance match and phase inverter for the marking amplifier 45, and also as a second stage amplifier for the framing switch 52. Its plate output is coupled to the grid of the second half of the tube 144, which is a third stage amplifier for the framing switch, and is also connected to the grid of one half of a tube 148.

The second grid of the tube 148 is fed from the cathode of the first half of the tube 144. Thus, the tube 148 is connected to operate as full wave plate rectifier with adjustable threshold cutoff. In the absence of a signal from the tube 144 the cathode bias of this tube is adjusted to complete cutoff by a potentiometer 150.

Turning to Fig. 4*c*, marking at the recorder occurs when a wiping pressure is applied by a rotating helix 152 through parallel sheets of carbon and white paper, slowly passing through the recorder, against a print bar 154 when the latter is in its forward position.

The print bar driving head consists of two armatures 156 and 158, attached to the print bar and located in a permanent magnetic field. The permanent magnet inducing this field is not shown, but the polarity which it includes in the poles opposite to these armatures is indicated by the symbols N and S in the drawing. The motion of the armatures is determined by the excitation of the driving coils surrounding them. Referring to Fig. 4*b*, one pair of driving coils, is excited when a tube 160, which may be referred to as the "white" tube, conducts. They cause the armatures to move the print bar away from the rotating helix. A second pair of driving coils is excited when a tube 162, which may be referred to as the "black" tube, conducts. They cause the armatures to move the print bar into its forward position where it is "wiped" by the rotating helix, marking the copy.

The functioning of the tubes 160 and 162 is controlled by the operation of the tube 148. A signal greater than the cutoff amplitude of the tube 148 will cause it to conduct, producing a negative bias on the grid of the "white" tube 160, causing it to cut off. The resulting increase in the plate voltage of the tube 160 is applied to the grid of the "black" tube 162, through a balancing network, greatly increasing its conduction.

The helix 152 is rotated by the synchronous motor 58, which is supplied with alternating current from the secondary winding of a vibrator transformer 164 (Fig. 4*a*). This transformer is energized by a vibrator 166. In practice, the secondary winding is also preferably connected through rectifiers to supply the voltages $B_2+$ and $B_3+$, and also to supply the voltage represented by the battery 114, but such circuits are conventional and are not shown.

Synchronizing is accomplished by continually adjusting the effective driving force acting upon the reed of the vibrator. This is done by means of the synchronizing tube 132. The plate of this tube is connected in series with the primary of a synchronizing transformer 168 to the output of the vibrator transformer 164. The grid is actuated by the synchronizing signal supplied by the output of the tube 130, mentioned above. The secondary of the transformer 168 is in series with the vibrator coil and the battery supply 120.

Conduction of the tube 132 may occur throughout the positive one-half cycle of the applied plate voltage. The magnitude of the current depends upon the phase relation between the plate voltage and the synchronizing signal applied to the grid. As a result of the rectifying action of the tube 132 and of the vibrator contacts, a pulsating voltage results, which, when connections are properly made with respect to polarity, alters the driving force on the reed. This provides the required frequency correction, and has been found in practice to maintain the correction over a considerable range of battery voltage.

In order for the vibrator to respond properly to the synchronizing signal, its natural frequency is adjusted to be a fraction of a cycle higher or lower than the synchronizing signal frequency.

Turning now to Fig. 4*c*, the motor 58 drives the helix 152 through a friction clutch 170. When a clutch locking lever 172 is moved forward, an ear 174 on the clutch disk engages it, stopping the rotation of the helix drum so that the left end of the helix is opposite the print bar. It will be noted, therefore, that the ear 174 must be positioned in relation to the helix 152 so that the helix will stop in the position just indicated when the clutch disk is engaged.

While the clutch is engaged by the lever 172 the motor 58 continues to rotate at its synchronous speed and the friction drive slips at the clutch face. When the locking lever is disengaged the helix drum resumes its constant synchronous speed.

The action of the locking lever 172 is controlled by a cam 176 which is driven by strokes of the framing device 54 through a pawl-ratchet assembly. The cam alternatively advances and retracts the locking lever with successive strokes of the impulse magnet.

The impulse magnet is energized by the output of the framing switch 52 of the receiver (Fig. 4*b*), through contacts of a framing signal relay 178. The framing switch 52 received its signals from the plate of the second half of the tube 144, mentioned above.

The sharply tuned anti-resonant framing carrier pass filter 48 discriminates against the marking carrier frequency. The output of the filter is coupled to one-half of a tube 180 which operates as a cathode follower type of grid rectifier. The grid of the other half of the tube 180 is connected to the cathode of the first half. The framing signal relay 178 is connected in series with the plate circuit of the second half of the tube 180. A condenser 182 in the cathode circuit of the detector half of the tube 180 holds the tube conducting for a sufficient length of time to ensure operation of the relay 178.

So long as the system is properly framely the framing pulse is suppressed by the commutator 56 (Fig. 4*c*) which closes contacts to ground these pulses as they appear at the input to the filter 48. When the recorder is out of frame, the commutator contacts will close out of synchronism with a framing pulse, allowing the pulse to enter the framing switch 52 over the lead 50. This causes the operation of the impulse magnet 54 through the operation of the framing signal relay 178. The locking lever 172, normally disengaged, is advanced, thereby stopping the clutch plate, the helix and the commutator. In this arrested position the contacts of the commutator are not closed, so that the succeeding framing pulse will be transmitted over the lead 50, and the impulse magnet will again be operated, retracting the locking lever through the cam action. This latter movement releases the clutch, allowing the friction coupling to drive the helix at the synchronous speed in a framed position. The whole framing operation takes place in two cycles of the framing pulse, which is two strokes of the drum in the transmitter.

Thus, it will be noted that the commutator 56 must be positioned in relation to the helix 152 so that two conditions are fulfilled: When the rotation of the helix is stopped the commutator must not be in contact with its brushes, and when the second framing pulse reengages the clutch the commutator will thereafter be in contact with its brushes when the third and successive framing pulses appear at the input to the filter 48.

*Suppression filter*

Fig. 2 shows the synchronizing carrier-frequency suppression filter 40, which is also shown in Fig. 4*b*. This filter is composed essentially of a pair of self inductances $L_1$ and $L_2$ having a mutual inductance M, the inductance $L_1$ being in series with a capacitance C and the inductance $L_2$ being in series with an adjustable portion of a potentiometer $r_2$. The potentiometer $r_2$ is in parallel with the condenser C. A resistor $r_1$ is assumed to include the resistance of the winding in $L_1$.

It may be noted that the only variable in this circuit is assumed to be the potentiometer. Other elements might also be assumed as the variable, for example the M or C, but for reasons of simplicity the preferred form of the filter is as shown in the drawing.

Assuming the same values of the carrier frequencies as above, the value of $r_2$ is much greater than the impedance of C in the range of 2000 through 4000 cycles per second. For example, one circuit according to this invention employs a nominal resistance $r_2$ of 25,000 ohms. The capacitance of C is approximately .05 microfarad, which means that the impedance of C varies from only about 800 ohms at 4000 cycles per second to about 1600 ohms at 2000 cycles per second. For this reason, the current passing through $L_1$ may be taken as essentially equal to the current passing through C.

Employing Kirchhoff's law in the circuit including $L_1$, we then have, approximately, $$e_1=i\left(r_1+j\omega L_1-\frac{j}{\omega C}\right) \tag{1}$$

where it is assumed that the mutual inductance has no effect on this circuit because negligible current flows in the inductance $L_2$. $\omega$ is defined as equal to $2\pi f$, $f$ being the frequency of voltage $e_1$.

Similarly, for the circuit including $L_2$ we have $$e_2=j\omega Mi-\frac{jki}{\omega C} \tag{2}$$

where $k$ is the fractional portion of the potentiometer in series with $L_2$. It is assumed as before that the currents flowing in $L_1$ and C are essentially equal. It will be seen that in Equation 1 the negative sign indicates that the sense of the capacitance term is opposite to that of the self inductance term. Similarly, in Equation 2 the negative sign indicates that the sense of the identical capacitance term multiplied by a constant is also opposite to that of the mutual inductance term. Equations 1 and 2, taken together, therefore presuppose a definite arrangement of the connections of the inductance $L_2$ relative to $L_1$, and this is termed, for convenience, a "series-aiding" arrangement.

These two equations yield the ratio $$\frac{e_1}{e_2}=\frac{r_1+j\left(\omega L-\frac{1}{\omega C}\right)}{j\left(\omega M-\frac{k}{\omega C}\right)} \tag{3}$$

The condition under which a voltage at $e_2$ would be completely suppressed would correspond to that frequency for which the ratio (3) became equal to infinity and the denominator became equal to zero. It can be readily seen that the condition is that $$\omega M=\frac{k}{\omega C},\text{ or }\omega^2=\frac{k}{MC} \tag{4}$$

Thus, by varying any one of $k$, M or C the suppressed frequency can readily be changed.

Another property of the circuit can easily be verified, namely, that under the conditions that $r_1$ is small and the circuit is supplied from a source of high impedance, there is a second point of partial suppression. This results from the unfavorable impedance match brought about when the input circuit is in resonance.

One advantage of the network heretofore described, in comparison with the use of a series-resonant circuit acting as a low impedance at the same frequency, is that complete suppression may be obtained with physically realizable coils having finite resistance.

Secondly, the single potentiometer gives a wide range of adjustment, as indicated by Equation 4. The equation also indicates that close tolerances of C and M are unnecessary.

Thirdly, the number of units needed to give the above response is smaller than the number in networks having similar characteristics, such as the double T type of impedance network.

Fourthly, by examination of Equation 4 it will be seen that the constancy of performance of the filter network depends only on C and the ratio $k$, since M is practically an invariable quantity for a rigid coil structure.

Fifth, of interest in amplifier interstage coupling, the network is grounded and is conductive to ground on the output side. Further, for low values of $k$ the input impedance to the following stage is low, and it is well known that this factor lends to the stability of that stage.

Another advantage is that the suppression frequency of the filter is not affected by the use of an isolating condenser in the input stage when such is needed. This may be seen from Equation 4.

It has already been indicated that for low values of $r_1$ a second frequency will be suppressed by the network for the condition $$\omega L_1=\frac{1}{\omega C}$$

Another way of obtaining multiple simultaneous points of suppression would be simply to tap the inductance $L_2$ in various places. This will affect M in Equation 2 and hence also the value of $\omega$ that corresponds to the suppressed frequency for the particular tap, as indicated by Equation 4. Multiple points of suppression may be useful in a number of cases, in fact, in any application where a filter is needed to suppress particular selected narrow frequency bands while transmitting the frequencies in a considerable range immediately below the suppressed frequencies with relatively low loss.

Still other potential uses of the network are indicated. For example, if used in a negative feed-back circuit it produces a selective pass filter in place of a suppression filter. Furthermore, if the gain at the frequency to which the circuit is adjusted is sufficiently great an oscillator results.

Having thus described my invention, I claim:

1. A four-terminal coupling network for suppressing a selected frequency while having a minimum attenuating effect upon lower frequencies, including a first circuit connected across two input terminals including, in series, a first resistance, a first self-inductance, and a parallel circuit having a capacitance in one branch and a potentiometer in the other branch, the potentiometer having an impedance of such value as to cause the current in the capacitance to be substantially equal to that in the first self-inductance, and a second circuit connected across two output terminals including, in series, a second self-inductance inductively coupled in series aiding relationship to the first self-inductance, and a selectable fraction of the potentiometer.

2. A four-terminal coupling network for suppressing a selected frequency $$\frac{\omega_0}{2\pi}$$

while having a minimum attenuating effect upon lower frequencies, including a first circuit connected across two input terminals including, in series, a first resistance, a first self-inductance, and a parallel circuit having a capacitance C in one branch and a potentiometer in the other branch, the potentiometer having an impedance of such value as to cause the current in the capacitance to be substantially equal to that in the first self-inductance, and a second circuit connected across two output terminals including, in series, a second self-inductance inductively coupled in series aiding relationship to the first self-inductance with a mutual inductance M, and a selectable fraction $k$ of the potentiometer, said network satisfying the relationship $$\omega_0^2=\frac{k}{MC}$$

3. A four-terminal coupling network for suppressing a selected frequency while having a minimum attenuating effect upon lower frequencies, including a first circuit connected across two input terminals including, in series, a first self-inductance and a parallel circuit having a capacitance in one branch and the whole impedance of a potentiometer in the other branch, and a second circuit connected across two output terminals including, in series, a second self-inductance inductively coupled in series aiding relationship to the first self-inductance, and a variable portion of the potentiometer.

4. A four-terminal coupling network for suppressing a selected frequency $$\frac{\omega_0}{2}$$

while having a minimum attenuating effect upon lower frequencies, including a first circuit connected across two input terminals including, in series, a first self-inductance and a parallel circuit having a capacitance C in one branch and a resistance in the other branch, the resistance having an impedance of such value as to cause the current in the capacitance at frequencies of the order of the suppressed frequency to be substantially equal to that in the first self-inductance, and a second circuit connected across two output terminals including, in series, a second self-inductance inductively coupled in series aiding relaitonship to the first self-inductance with a mutual inductance M, and a portion $k$ of said resistance, said network satisfying the relationship $$\omega_0^2=\frac{k}{MC}$$

5. A four-terminal coupling network for suppressing a selected frequency while having a minimum attenuating effect upon lower frequencies, including a first circuit connected across two input terminals including, in series, a first self-inductance and a parallel circuit having a capacitance in one branch and a resistance in the other branch, and a second circuit connected across two output terminals including, in series, a second self-inductance and a parallel circuit including an appreciable portion of said resistance in one branch and all of said capacitance in the other branch, said second self-inductance being inductively coupled in series aiding relationship to the first self-inductance and said second circuit being inductive at all frequencies below the suppressed frequency.

References Cited in the file of this patent

UNITED STATES PATENTS

| | | |
|---|---|---|
| 1,945,427 | Farnham | Jan. 30, 1934 |
| 2,050,834 | Farnham | Aug. 11, 1936 |
| 2,301,023 | Darlington | Nov. 3, 1942 |
| 2,512,647 | Hester | June 27, 1950 |
| 2,522,919 | Artzt | Sept. 19, 1950 |
| 2,540,922 | Wickham | Feb. 6, 1951 |
| 2,556,970 | McFarlane | June 12, 1951 |

FOREIGN PATENTS

| | | |
|---|---|---|
| 625,197 | Great Britain | June 23, 1949 |